United States Patent
Kirk et al.

(10) Patent No.: US 12,153,576 B1
(45) Date of Patent: Nov. 26, 2024

(54) QUERY ACCELERATION FOR COMPOUND DISJUNCTIVE CONDITIONS

(71) Applicant: Amazon Technologies, Inc., Seattle, WA (US)

(72) Inventors: Steven Alan Kirk, Chelmsford, MA (US); Mohammed Alkateb, Rancho Palos Verdes, CA (US); Andreas Michael Kipf, Munich (DE)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/477,934

(22) Filed: Sep. 29, 2023

(51) Int. Cl.
*G06F 16/20* (2019.01)
*G06F 16/2453* (2019.01)
*G06F 16/2455* (2019.01)
*G06F 16/248* (2019.01)

(52) U.S. Cl.
CPC .. *G06F 16/24544* (2019.01); *G06F 16/24564* (2019.01); *G06F 16/248* (2019.01)

(58) Field of Classification Search
None
See application file for complete search history.

(56) References Cited

U.S. PATENT DOCUMENTS

| | | | |
|---|---|---|---|
| 8,135,576 B2 | 3/2012 | Haley | |
| 8,738,608 B2 | 5/2014 | Pauly | |
| 11,010,378 B1 | 5/2021 | Cruanes | |
| 2007/0073642 A1 | 3/2007 | Ghosh | |
| 2010/0036803 A1 | 2/2010 | Vemuri | |
| 2014/0067789 A1* | 3/2014 | Ahmed | G06F 16/24544 707/E17.017 |
| 2015/0234888 A1* | 8/2015 | Ahmed | G06F 16/2425 707/765 |
| 2020/0341981 A1 | 10/2020 | Fender | |
| 2020/0341983 A1 | 10/2020 | Kirk et al. | |
| 2024/0126757 A1 | 4/2024 | Ahmed | |

OTHER PUBLICATIONS

U.S. Appl. No. 18/477,926, filed Sep. 29, 2023, Steven Alan Kirk, et al.
Ramesh, et al., "Optimizing Distributed Joins with Bloom Filters," dated 2009, pp. 1-12.
He, et al., "Bloom Filter-Based Parallel Architecture for Accelerating Equi-Jin Operation on FPGA," MDPI, Electronics Jul. 2021, pp. 1-10.
Bergami, On Efficiently Equi-Joining Graphs, Jul. 16, 2021, 2021 Association for Computing Machinery, pp. 222-231.

* cited by examiner

*Primary Examiner* — Jau Shya Meng
(74) *Attorney, Agent, or Firm* — S. Scott Foster; Kowert, Hood, Munyon, Rankin & Goetzel, P.C.

(57) ABSTRACT

Queries may be accelerated with compound disjunctive conditions. A query is received and a compound disjunctive condition identified. Different strategies, such as inferring and adding additional disjunctive join conditions, may be implemented as part of query planning. These additional disjunctive join conditions may be included in a query plan generated for the query, which is then executed to return a result for the query.

20 Claims, 10 Drawing Sheets

QUERY ACCELERATION FOR COMPOUND DISJUNCTIVE CONDITIONS

BACKGROUND

As the technological capacity for organizations to create, track, and retain information continues to grow, a variety of different technologies for managing and storing the rising tide of information have been developed. Database systems, for example, provide clients with many different specialized or customized configurations of hardware and software to manage stored information. However, the increasing amounts of data that organizations must store and manage often correspondingly increases both the size and complexity of data storage and management technologies, like database systems, which in turn escalate the cost of maintaining the information. New technologies more and more seek to reduce both the complexity and storage requirements of maintaining data while simultaneously improving the efficiency of data processing.

Figure 1:
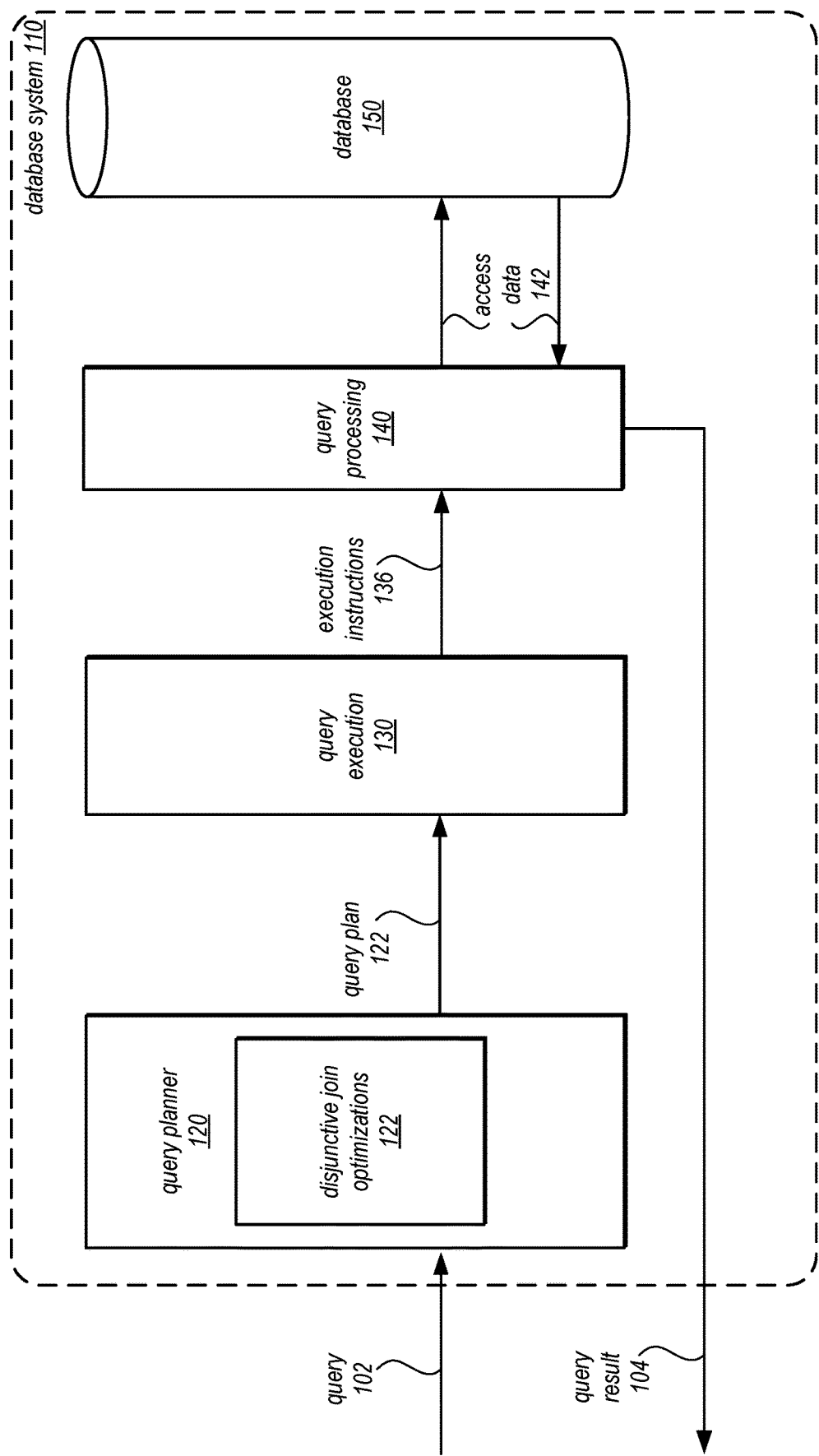
FIG. 1 is a logical block diagram illustrating disjunctive join optimizations implemented as part of query planning of a database system, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various techniques for query acceleration for disjunctive equijoin conditions are described herein. Additionally, various techniques for query acceleration for compound disjunctive equijoin conditions are described herein.

Queries often contain a set of conditions that are OR'ed together, which is referred to as a disjunction or a disjunctive condition. When those OR'ed conditions contain references to columns from multiple tables, then it is referred to as a disjunctive join condition. Disjunctive join conditions cannot be used as the basis for any efficient join evaluation, so they are applied after the results of the join are evaluated as a join post-filter.

In many cases, there is no way to simplify such disjunctive join conditions, or to make them more useful. However, for some cases there are techniques that can infer from that disjunctive join condition one or more disjunctive conditions that are each local to a single table, thereby allowing rows to be filtered at the table scan rather than after the join and therefore reducing the cost of the join.

According to the rules of logic, given a disjunction of conditions of the form:

(<A> OR (<B> AND <C>) OR (<D> AND <E> AND <F>))

Additional disjunctive conditions can be derived that are guaranteed to be true anytime the original condition is true. However, these derived conditions are not equivalent to the original condition, and therefore cannot be a replacement for that original condition. As such, they are a necessary but not sufficient conditions, which means that theoretically there are sets of values which can satisfy each of these derived conditions but which will not completely satisfy the original condition. Accordingly, there may be an option to add these derived conditions to the set of conditions in the query (a process known as condition inference) whenever there is some advantage to doing so.

These derived disjunctions could be created by taking one or more condition from each arm of the disjunction (e.g., from each disjunct) and creating a new disjunction by putting them together. For the first disjunct, since there is only one condition, <A>, therefore all derived disjunctions must include the <A> condition. For the second disjunct, there are two nested conjuncts, <B> and <C>, so all derived disjunctions must contain either <B> or <C> or both of those conditions as a nested conjunct. For the third disjunct, there are three nested conjuncts, <D>, <E>, and <F>, so all derived disjunctions must contain at least one of those three, although they could contain a nested conjunction of any two of them or even all three of them.

Given these logic rules, the set of all 20 possible derived disjunctions from the original disjunction is:

(<A> OR <B> OR <D>)
(<A> OR <B> OR <E>)
(<A> OR <B> OR <F>)

(<A>OR<C>OR<D>)
(<A>OR<C>OR<E>)
(<A>OR<C>OR<F>)
Using both terms from the second disjunct and one from the third:
(<A>OR (<B>AND<C>) OR<D>)
(<A>OR (<B>AND<C>) OR<E>)
(<A>OR (<B>AND<C>) OR<F>)
Using one term from the second disjunct and two from the third disjunct:
(<A>OR<B>OR (<D>AND<E>))
(<A>OR<B>OR (<D>AND<F>))
(<A>OR<B>OR (<E>AND<F>))
(<A>OR<C>OR (<D>AND<E>))
(<A>OR<C>OR (<D>AND<F>))
(<A>OR<C>OR (<E>AND<F>))
Using one term from the second disjunct and all three from the third disjunct:
(<A>OR<B>OR (<D>AND<E>AND<F>))
(<A>OR<C>OR (<D>AND<E>AND<F>))
Using both terms from the second disjunct and two from the third disjunct:
(<A>OR (<B>AND<C>) OR (<D>AND<E>))
(<A>OR (<B>AND<C>) OR (<D>AND<F>))
(<A>OR (<B>AND<C>) OR (<E>AND<F>))

For this example disjunction there are 20 possible derived disjunctive conditions. In theory, all of them could be inferred. However, doing so would likely add condition evaluation cost when performing query planning that was large enough to actually degrade the performance of the query containing that condition. Therefore, the following techniques describe different was to identify which of those 20 derived possibilities will actually benefit the performance of the query, and therefore should be inferred.

Different selection criteria, as discussed in detail below with regard to FIGS. 6-9 may be used to recognized and handle disjunctive join conditions of varying scenarios in order to provide query performance improvement without increasing the cost of query planning.

For instance, in the above example because the first disjunct contains only one term, <A> (assuming that <A> only references one table), then the only local disjunction chosen to infer is one local to the table referred to in <A>. If it is assumed that <C>, <E>, and <F> contain references only to the same table as <A>, then the only condition we that may be chosen to infer from the set of 21 derived possibilities is the local disjunction:
(<A>OR<C>OR (<E>AND<F>))

The following description may describe examples of different join conditions in queries. A join condition may be any condition that refers to columns from more than one table. For example:
t.x=r.x
t.x between r.x and r.y An equijoin condition may refer to any condition that equates a column from one table to a column from a different table. These are the most common kind of join condition, and they are the basis for the most efficient algorithms for joins. Sometimes this definition is stretched to include equality conditions between a functional expression from one table and a functional expression from a different table. For example:
t.x=r.x
DATE_PART(YEAR, t.x)=DATE_PART(YEAR, r.x)

A disjunctive join condition may refer to any condition that contains one or more OR's combining sub-conditions. For example:

((t.updated_on>r.col0) OR (r.col0 IS NULL))

A compound disjunctive join condition may refer to any join condition that contains one or more OR's combining sub-conditions, where at least one of those sub-conditions is one or more AND's combining sub-sub-conditions. For example:
(t.x>10 OR (t.x=9 AND r.x<=9))

A disjunctive equijoin condition may refer to a join condition containing only one or more OR's combining a set of equijoin conditions. For example:
(t.x=r.x OR t.x=r.y)
(t.x=r.x OR t.x=r.y OR t.x=r.z)
(t.x=r.x OR t.y=r.y)

FIG. 1 is a logical block diagram illustrating disjunctive join optimizations implemented as part of query planning of a database system, according to some embodiments. Database system 110 may be a database or other data store that provides management, maintenance, and/or access to data or information. For example, database 110 may be a relational database that provides online transactional processing (OLTP), such as may be found in databases supporting transaction heavy workloads, or online analytical processing (OLAP), such as may be data warehouse style databases that support heavy analytical workloads. Databases system 110 may be a distributed database system (e.g., similar to processing clusters discussed below with regard to FIGS. 2 and 3) or may be a non-distributed database system, in other embodiments. In at least some embodiments, disjunctive join optimizations 122 may be implemented for a single-node database system (e.g., which may still take advantage of disjunctive join optimizations).

Database system 110 may receive a query 102. Query 102 may be specified according to a query language, protocol, Application Programming Interface (API) or other format, in various embodiments. Query planner 120 may generate a query plan 122 using various query planning techniques (e.g., cost-based optimizations, etc.), including disjunctive join optimizations 122, discussed in detail below with regard to FIGS. 6-9. Various combinations of these optimizations may be performed for the same query. For instance, any combination of the techniques described in FIG. 6, 7, or 8 may be combined for a single query where appropriate. Cost-based analyses may be used to selected between different query plans which may use individual ones or combinations of the disjunctive join optimization techniques, in some embodiments. The query plan 122 (generated and including one or more disjunctive join optimizations 122) may then be provided to query execution 130 for performing the query.

Query execution 130 may then generated and send execution instructions 136. In some embodiments, query execution 130 may perform code generation and compilation to generate the execution instructions 136. Query processing 140 may then access data 142 in database 150 in order perform the query and return a query result 104.

Please note that the previous description of a database system is a logical description and thus is not to be construed as limiting as to the implementation of these features.

This specification continues with a general description of a provider network that implements database services (or other data storage or processing services) that may implement disjunctive join optimizations implemented as part of query planning. Then various examples of one such database service, including different components/modules, or arrangements of components/module that may be employed as part of implementing the techniques are discussed. A number of different methods and techniques to implement disjunctive join optimizations implemented as part of query planning, some of which are illustrated in accompanying flowcharts, are then discussed. Finally, a description of an example computing system upon which the various components, modules, systems, devices, and/or nodes may be implemented is provided. Various examples are provided throughout the specification.

Figure 2:
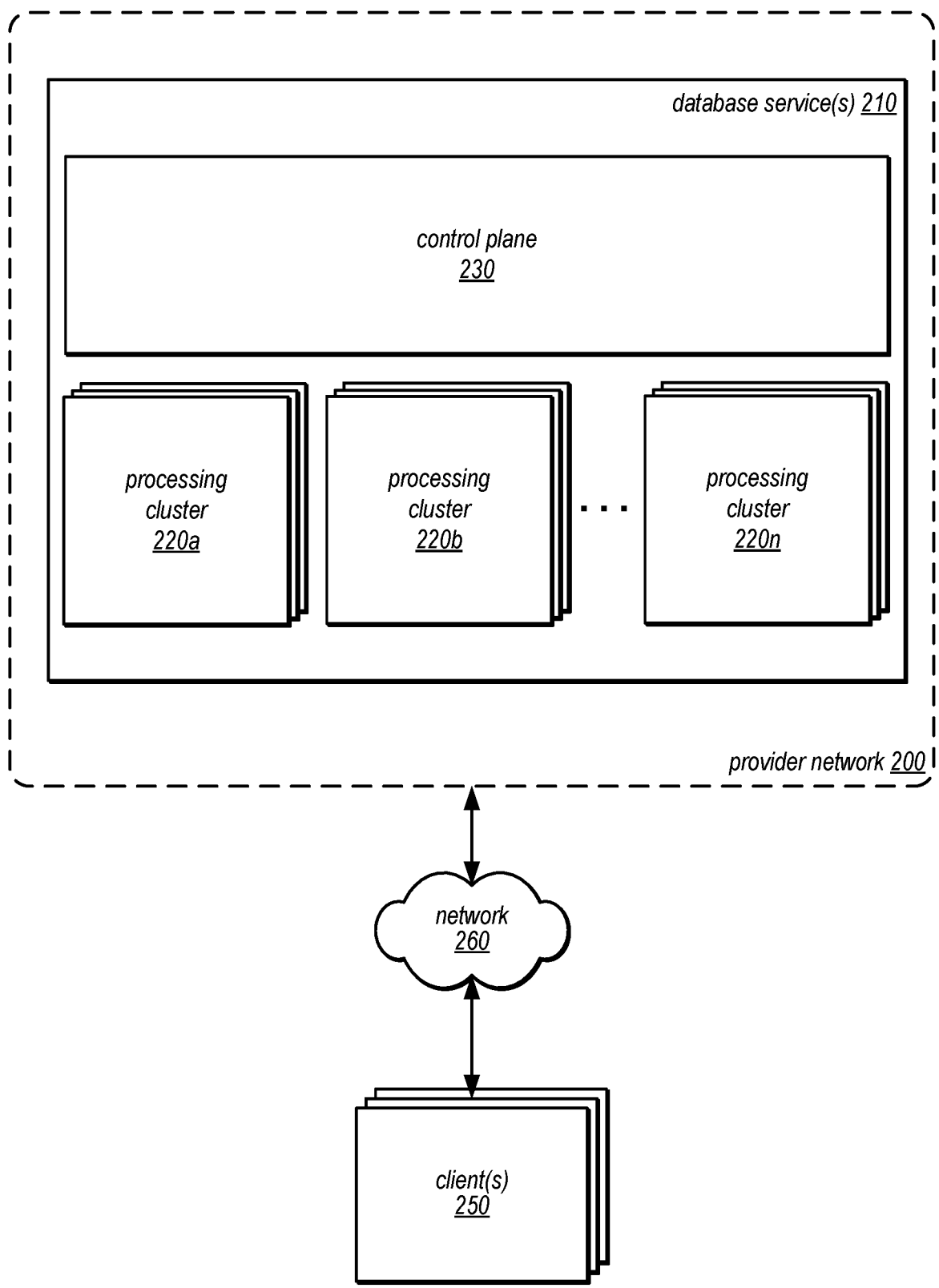
FIG. 2 is a logical block diagram illustrating a provider network offering a database service that provides disjunctive join optimizations implemented as part of query planning, according to some embodiments.

FIG. 2 is a logical block diagram illustrating a provider network offering a database service that provides disjunctive join optimizations implemented as part of query planning, according to some embodiments. Provider network 200 may be a private or closed system or may be set up by an entity such as a company or a public sector organization to provide one or more services (such as various types of cloud-based storage) accessible via the Internet and/or other networks to clients 250, in one embodiment. Provider network 200 may be implemented in a single location or may include numerous data centers hosting various resource pools, such as collections of physical and/or virtualized computer servers, storage devices, networking equipment and the like (e.g., computing system 1000 described below with regard to FIG. 10), needed to implement and distribute the infrastructure and services offered by the provider network 200, in one embodiment. In some embodiments, provider network 200 may implement various computing resources or services, such as database service(s) 210 or other data processing services, (e.g., a map reduce service, a data warehouse service, and other large scale data processing services) and/or any other type of network based services (which may include a virtual compute service and various other types of storage, processing, analysis, communication, event handling, visualization, data cataloging, data ingestion (e.g., ETL), and security services not illustrated), in some embodiments.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 10 and described below, in one embodiment. In various embodiments, the functionality of a given system or service component (e.g., a component of database service(s) 210 may be implemented by a particular node or may be distributed across several nodes. In some embodiments, a given node may implement the functionality of more than one service system component (e.g., more than one data store component).

Database services 210 may be various types of data processing services that perform general or specialized data processing functions (e.g., analytics, big data querying, or any other type of data processing operation) over data that is stored across multiple storage locations, in some embodiments. For example, in at least some embodiments, database services 210 may include various types of database services (e.g., relational) for storing, querying, and updating data. Such services may be enterprise-class database systems that are scalable and extensible. Queries may be directed to a database in database service(s) 210 that is distributed across multiple physical resources, as discussed below, and the database system may be scaled up or down on an as needed basis, in some embodiments. The database system may work effectively with database schemas of various types and/or organizations, in different embodiments. In some embodiments, clients/subscribers may submit queries or other requests (e.g., requests to add data) in a number of ways, e.g., interactively via an SQL interface to the database system or via Application Programming Interfaces (APIs). In other embodiments, external applications and programs may submit queries using Open Database Connectivity (ODBC) and/or Java Database Connectivity (JDBC) driver interfaces to the database system.

In some embodiments, database service(s) 210 may include services that process requests to data that is not stored in fully structured storage (e.g., non-relational or NoSQL databases). Database services 210 may access the data that is semi-structured or not-structured in storage, such as data objects of unstructured or semi-structured data in a separate data storage service, in one embodiment. In other embodiments, database services 210 may locally store, managed, and access semi-structured or not-structured data (e.g., an object-based and/or key-value data store that stores tables joined with tables in other services, such as database service(s) 210 or the same storage service).

Generally speaking, clients 250 may encompass any type of client that can submit network-based requests to provider network 200 via network 260, including requests for database service(s) (e.g., a request or other query to a database in database services 210, etc.). For example, a given client 250 may include a suitable version of a web browser, or may include a plug-in module or other type of code module that can execute as an extension to or within an execution environment provided by a web browser. Alternatively, a client 250 may encompass an application, such as a database application (or user interface thereof), a media application, an office application or any other application that may make use of database services 210 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that can interact directly with provider network 200. In some embodiments, client 250 may generate network-based services requests according to a Representational State Transfer (REST)-style network-based services architecture, a document- or message-based network-based services architecture, or another suitable network-based services architecture. In some embodiments, clients of database service(s) 210 may be internal to or implemented as part of provider network 200 (e.g., on another provider network service not illustrated).

In some embodiments, a client 250 may provide access to provider network 200 to other applications in a manner that is transparent to those applications. For example, client 250 may integrate with an operating system or file system to provide storage on one of database service(s) 210 (e.g., a database table that stores data on behalf of the operating system or file system). However, the operating system or file system may present a different storage interface to applications, such as a conventional file system hierarchy of files, directories and/or folders. In such an embodiment, applications may not need to be modified to make use of the storage system service model. Instead, the details of interfacing to database service(s) 210 may be coordinated by client 250 and the operating system or file system on behalf of applications executing within the operating system environment. Similarly, a client 250 may be an analytics application that relies upon database services 210 to execute various queries for data already ingested or stored in the database service 210 or data stored in a data lake hosted in other storage service(s) in provider network 200 that may be accessible to a query engine implemented as part of database service(s) 210).

Clients 250 may convey network-based services requests (e.g., access requests to read or write data) via network 260, in one embodiment. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks, in one embodiment. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

In at least some embodiments, a database service 210 may be a data warehouse service or other database that stores data across multiple storage locations (e.g., across different nodes in a processing cluster). In such scenarios a data warehouse service, may offer clients a variety of different data management services, according to their various needs. In some cases, clients may wish to store and maintain large of amounts data, such as sales records marketing, management reporting, business process management, budget forecasting, financial reporting, website analytics, or many other types or kinds of data, in one embodiment. A client's use for the data may also affect the configuration of the data management system used to store the data. For instance, for certain types of data analysis and other operations, such as those that aggregate large sets of data from small numbers of columns within each row, a columnar database table may provide more efficient performance, in one embodiment. In other words, column information from database tables may be stored into data blocks on disk, rather than storing entire rows of columns in each data block (as in traditional database schemes). The following discussion describes various embodiments of a column-oriented (sometimes referred to as "columnar") database service (e.g., such as data warehouse service). However, various versions of the components discussed below as may be equally adapted to implement embodiments for various other types of systems, such as row-oriented database systems. Therefore, the following examples are not intended to be limiting as to various other types or formats of structured data that may be stored, accessed, or otherwise managed by database service 210.

In some embodiments, storing table data in such a columnar fashion may reduce the overall disk I/O requirements for various queries and may improve analytic query performance. For example, storing database table information in a columnar fashion may reduce the number of disk I/O requests performed when retrieving data into memory to perform database operations as part of processing a query (e.g., when retrieving all of the column field values for all of the rows in a table) and may reduce the amount of data that needs to be loaded from disk when processing a query. Conversely, for a given number of disk requests, more column field values for rows may be retrieved than is necessary when processing a query if each data block stored entire table rows. In some embodiments, the disk requirements may be further reduced using compression methods that are matched to the columnar storage data type. For example, since each block contains uniform data (i.e., column field values that are all of the same data type), disk storage and retrieval requirements may be further reduced by applying a compression method that is best suited to the particular column data type. In some embodiments, the savings in space for storing data blocks containing only field values of a single column on disk may translate into savings in space when retrieving and then storing that data in system memory (e.g., when analyzing or otherwise processing the retrieved data).

Database service 210 may be implemented by a large collection of computing devices, such as customized or off-the-shelf computing systems, servers, or any other combination of computing systems or devices, such as the various types of systems 1000 described below with regard to FIG. 10, in some embodiments. Different subsets of these computing devices may be controlled by control plane 230. Control plane 230, for example, may provide an interface to clients or users who wish to interact with the processing clusters 220 managed by control plane 230. For example, the interface may implement one or more Application Programming Interfaces (APIs) to allow client systems to programmatically invoke database service operations, functions, or other features and/or the interface may implement or provide one or more graphical user interfaces (GUIs) for storage clients (e.g., as a web-console). The interface may allow clients to select various control functions offered by database service 210 for the processing clusters 220 hosted in the database service 210, in some embodiments. For example, a user may make adjustments to workload allocations, prioritization schemes, cluster size, network mappings or other operations or tasks for performing a query.

In at least some embodiments, control plane 230 may implement cluster performance monitoring, which may track, store, organize and/or evaluate performance metrics collected for queries performed at processing clusters 220. For example, performance monitoring may receive reported metrics from a leader node, and store them in a common storage location (e.g., in a file, direct, or object within a storage service) for the database (or user account associated with the database). In some embodiments, performance monitoring may evaluate processing cluster performance in order to trigger the performance of various control plane 230 operations (e.g., node replacement or failover operations). In some embodiments, cluster scaling may be implemented as part of control plane 230 to respond to user requests to add or remove node from a processing cluster or automatically triggered requests/events to add or remove nodes (e.g., based on utilization thresholds for processing, storage, network, or other cluster resource).

Various clients (or customers, organizations, entities, or users) may wish to store and manage data using database service 210, in some embodiments. Processing clusters, such as processing clusters 220a, 220b, and 220n may respond to various requests, including write/update/store/redistribute requests (e.g., to add data into storage) or other queries for data (e.g., such as a Server Query Language request (SQL) for particular data), as discussed below with regard to FIG. 3, along with many other data management or storage services, in some embodiments. Queries may be directed to data that is locally hosted as part of database service 210 or stored elsewhere that is fully structured data or queries directed to data that is not-structured, such as log records, event data, or machine generated data stored in another storage service (not illustrated), in some embodiments.

Multiple users or clients may access a processing cluster 220 to obtain data warehouse services, in one embodiment. In at least some embodiments, a database service 210 may provide network endpoints to the clusters which allow the clients to send requests and other messages directly to a particular cluster. Network endpoints, for example, may be a particular network address, such as a URL, which points to a particular cluster, in one embodiment. For instance, a client may be given the network endpoint "http://mycluster.com" to send various request messages to. Multiple clients (or users of a particular client) may be given a network endpoint for a particular cluster, in one embodiment. Various security features may be implemented to prevent unauthorized users from accessing the clusters, in some embodiments. Conversely, a client may be given network endpoints for multiple clusters, in one embodiment.

Processing clusters 220 may provide an enterprise-class database query and management system that allows users to send data processing requests to be executed by the clusters 220, such as by sending a data processing request to a cluster control interface implemented by the processing clusters, in some embodiments. Processing clusters 220 may perform data processing operations with respect to data stored locally in a processing cluster. Requests sent to a processing cluster 220 may be directed to local data stored in the processing cluster, in some embodiments. Therefore, processing clusters may implement local data processing to plan and execute the performance of requests or other queries with respect to local data in the processing cluster in one embodiment. In some embodiments, the processing clusters may access or send processing instructions to data that is stored remote from and/or external to the processing clusters, such as data stored in another service.

Processing clusters 220 may allow users of database service 210 to perform data warehouse functions, such as fast querying capabilities over structured data, integration with various data loading and ETL (extract, transform, and load) tools, client connections with best-in-class business intelligence (BI) reporting, data mining, and analytics tools, and optimizations for very fast execution of complex analytic queries such as those including multi-table joins, subqueries, and aggregation, more efficiently, in various embodiments. In other embodiments, database service 210 and/or processing clusters 220 may offer query capabilities may query over other types of data (e.g., semi-structured data, unstructured data, various other kinds of data, such as media, or no-schema data).

Figure 3:
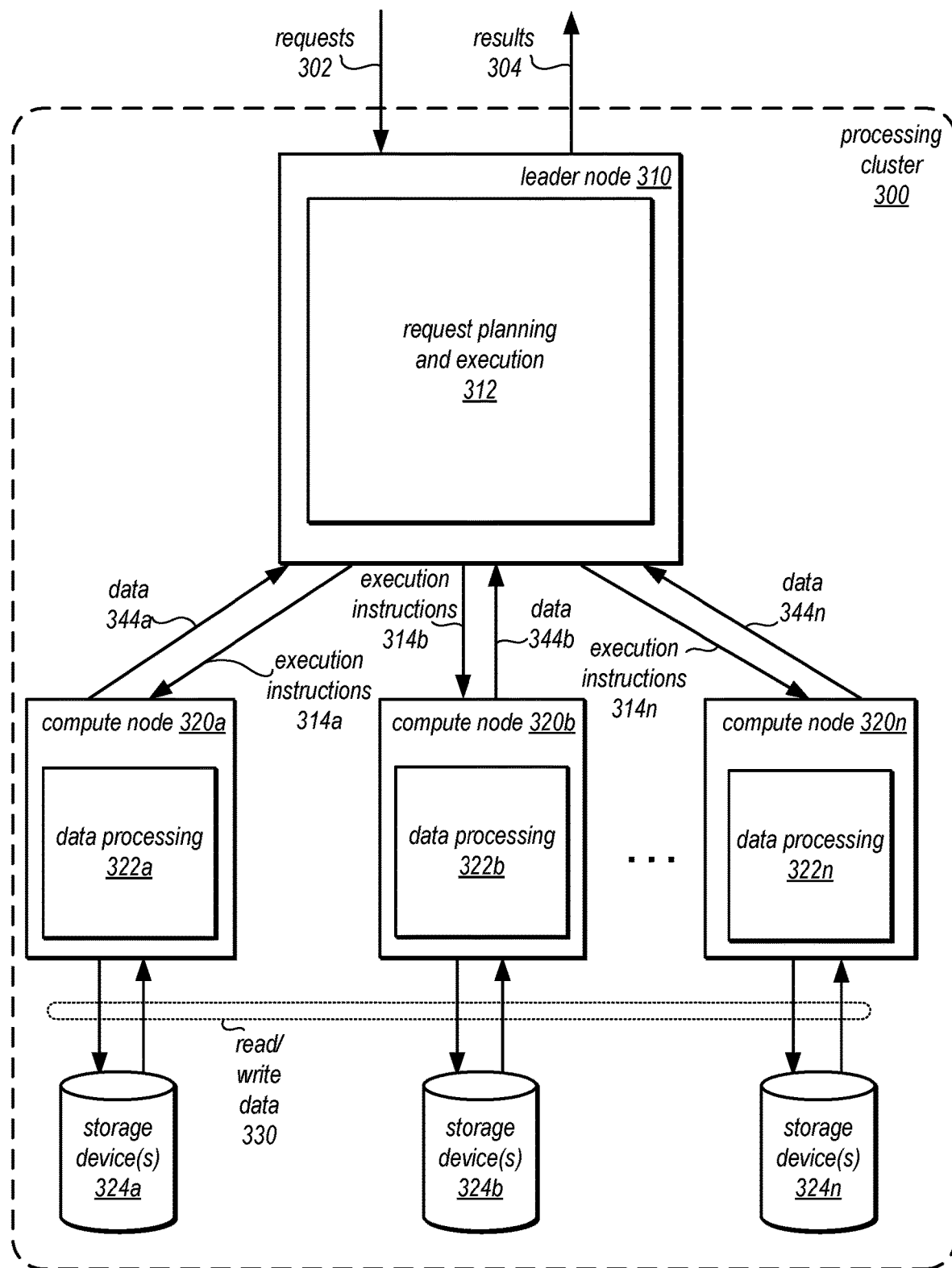
FIG. 3 is a logical block diagram illustrating a processing cluster of a database service that implements disjunctive join optimizations implemented as part of query planning, according to some embodiments.

FIG. 3 is a logical block diagram illustrating a processing cluster of a database service that implements disjunctive join optimizations implemented as part of query planning, according to some embodiments. Processing cluster 300 may be data warehouse service cluster, like processing clusters 220 discussed above with regard to FIG. 2, or another processing cluster that distributes execution of a query among multiple processing nodes, in one embodiment. As illustrated in this example, a processing cluster 300 may include a leader node 310 and compute nodes 320a, 320b, and 320n, which may communicate with each other over a network or other interconnect (not illustrated), in one embodiment. Leader node 310 may implement request planning and execution 312 to generate plan(s) and instructions 314 for executing various requests 302, such as query, or requests to update, add, modify, or remove data, on processing cluster 300, in some embodiment. As discussed in detail below with regard to FIG. 4, in some embodiments, the request planning may implement request planning and execution 312 so as to use either or both code generation/compilation and plan interpretation in various scenarios to perform requests 302.

Leader node 310 may also implement metric planning history/performance metric collection (not illustrated) to collect and report performance metrics collected for various events, units of work, or other portions a query or other operation's performance, compute node or leader node performance, and history of operations performed, in some embodiments. As described herein, each node in a processing cluster 300 may include attached storage, such as storage device(s) 324a, 324b, and 324n, on which a database, including tables and materialized views (or portions thereof) may be stored on behalf of clients (e.g., users, client applications, and/or storage service subscribers), in one embodiment.

Note that in at least some embodiments, data processing capability may be separated from compute nodes, and thus in some embodiments, additional components may be implemented for processing requests. Additionally, it may be that in some embodiments, no one node in processing cluster 300 is a leader node as illustrated in FIG. 3, but rather different nodes of the nodes in processing cluster 300 may act as a leader node or otherwise direct processing of requests to data stored in processing cluster 300, in one embodiment. While nodes of processing cluster may be implemented on separate systems or devices, in at least some embodiments, some or all of processing cluster may be implemented as separate virtual nodes or instance on the same underlying hardware system (e.g., on a same server).

Leader node 310 may manage communications with clients, such as clients 250 discussed above with regard to FIG. 2, in one embodiment. For example, leader node 310 may be a server that receives an access request (e.g., a query for data or a request to add data) 302 from various client programs (e.g., applications) and/or subscribers (users), then parses them and develops an execution plan (e.g., query plan(s)) to carry out the associated database operation(s).

Leader node 310 may develop the series of steps necessary to obtain results for query 302, in one embodiment. Query 302 may be a query directed to a database table that is stored within processing cluster 300 (e.g., at one or more of compute nodes 320), in one embodiment. Leader node 310 may also manage the communications among compute nodes 320 instructed to carry out database operations for data stored in the processing cluster 300, in one embodiment. For example, node-specific request instructions 314 may be generated or compiled code or interpreted and/or previously compiled executors that is distributed by leader node 310 to various ones of the compute nodes 320 to carry out the steps needed to perform a query or other operation in request 302, including executing the operations to generate intermediate results of request 302 at individual compute nodes that may be sent back to the leader node 310, in one embodiment. Leader node 310 may receive data and responses or results (e.g., data 344a, 344b, and 344c) from compute nodes 320 in order to determine a final result for a request, in one embodiment. A database schema, data format and/or other metadata information for the data stored among the compute nodes, such as the data tables stored in the cluster, may be managed and stored by leader node 310 or obtained from a separate store (e.g., a data catalog service), in some embodiments. Request planning and multi-engine execution 312 may include the generation and selection of a plan to perform requests 302, in some embodiments.

Processing cluster 300 may also include compute nodes, such as compute nodes 320a, 320b, and 320n. Compute nodes 320, may for example, be implemented on servers or other computing devices, such as those described below with regard to computer system 1000 in FIG. 10, and each may include individual query processing "slices" defined, for example, for each core of a server's multi-core processor, one or more data processing engine(s), such as data processing 322a, 322b, and 322n, to execute the instructions 314 or otherwise perform the portions of the request plan assigned to the compute node, in one embodiment. Data processing 322 may access a certain memory and disk space in order to process a portion of the workload for a request that is sent to one or more of the compute nodes 320. Data processing 322 may access attached storage, such as 322a, 322b, and 322n, to perform operation(s), in one embodiment. For example, data processing 322 may scan data in attached storage 324, access indexes, perform joins, semi joins, aggregations, or any other processing operation assigned to the compute node 320, in one embodiment. Compute nodes 320 may send intermediate or final results from requests back to leader node 310 for final result generation (e.g., combining, aggregating, modifying, joining, etc.). Data, such as a database table, may be partitioned or otherwise distributed across the storage device(s) 324 as different partitions or shards of the data, in some embodiments. Compute nodes 320 may receive instructions specific to the shard(s) or partition(s) of the data to which the compute node 320 has access. Compute nodes 320 may implement metrics collection agents (not illustrated) in order to obtain the various performance metrics that may be collected for performing performance analysis for query planning, optimization, and execution of subsequent database queries.

Storage device(s), such as storage devices 324a, 324b, and 324n, may be implemented as one or more of any type of storage devices and/or storage system suitable for storing data accessible to the compute nodes, including, but not limited to: redundant array of inexpensive disks (RAID) devices, disk drives (e.g., hard disk drives or solid state drives) or arrays of disk drives such as Just a Bunch Of Disks (JBOD), (used to refer to disks that are not configured according to RAID), optical storage devices, tape drives, RAM disks, Storage Area Network (SAN), Network Access Storage (NAS), or combinations thereof. In various embodiments, disks may be formatted to store database tables (e.g., in column oriented data formats or other data formats).

Figure 4:
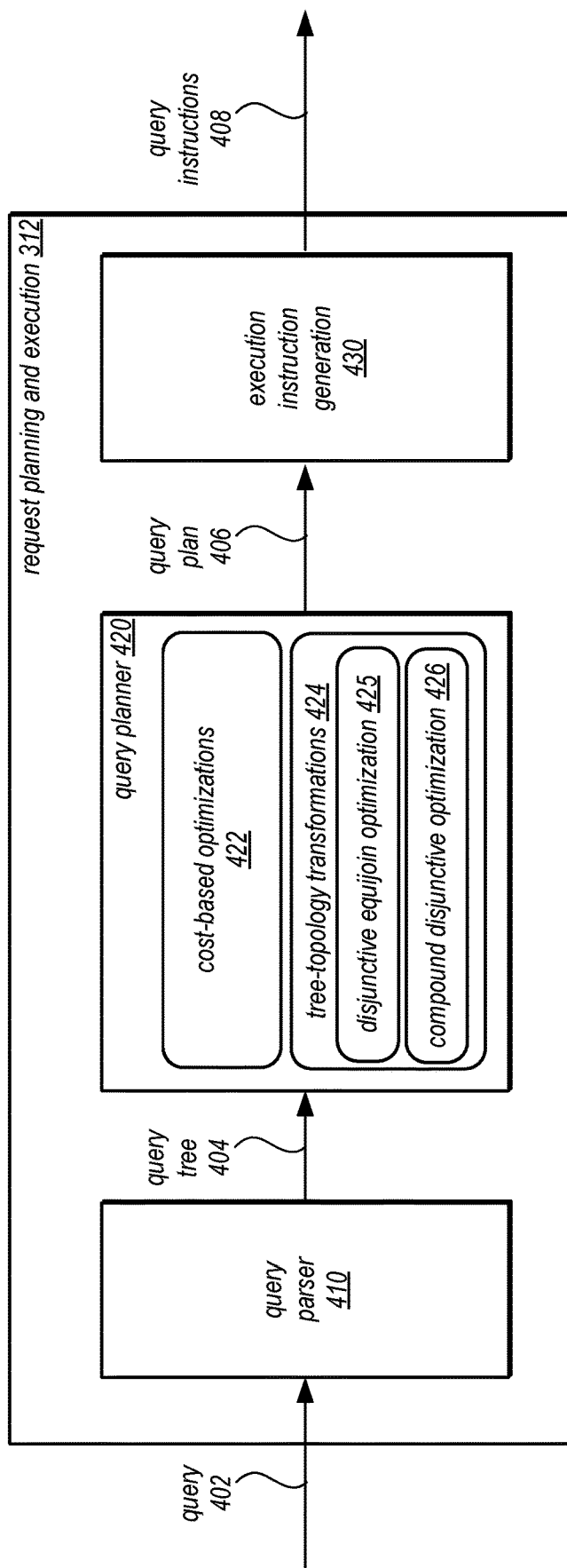
FIG. 4 is a block diagram illustrating request planning and multi-engine execution, according to some embodiments.

FIG. 4 is a block diagram illustrating request planning and multi-engine execution, according to some embodiments. Request planning and multi-engine execution 312 may receive a query 402 at query parser 410 which may generate a query tree 404 (or other representation) to provide to query planner 420. Query planner 420 may then apply various planning techniques to generate the query plan 406 which is provided to instruction generation 430. For example, query planner 420 may implement cost-based optimizations to compare different query plan versions and use cost estimation techniques to select a least costly plan. Tree topology transformations 424 may evaluate the structure and operations in query plan (e.g., as illustrated in FIG. 5) in order to perform various operations, including disjunctive equijoin optimization 425, as discussed below with regard to FIGS. 6-8 and compound disjunctive optimization 426, as discussed below with regard to FIG. 9.

Execution instruction generation 430 may use various code generation definitions to generate code for performing different steps of a query plan, in some embodiments. For example, a code definition may describe various "print statements" to describe what the code should be for a step as a print statement parameter (e.g., "print-stmt("input-parameter")"). The resulting code generated by applying the code definition may then be compiled using a compiler (corresponding to the language of the code generated, such as a C++ compiler for C++ code), which generates executable code objects (e.g., binary objects) to perform the query instructions 408.

Figure 5:
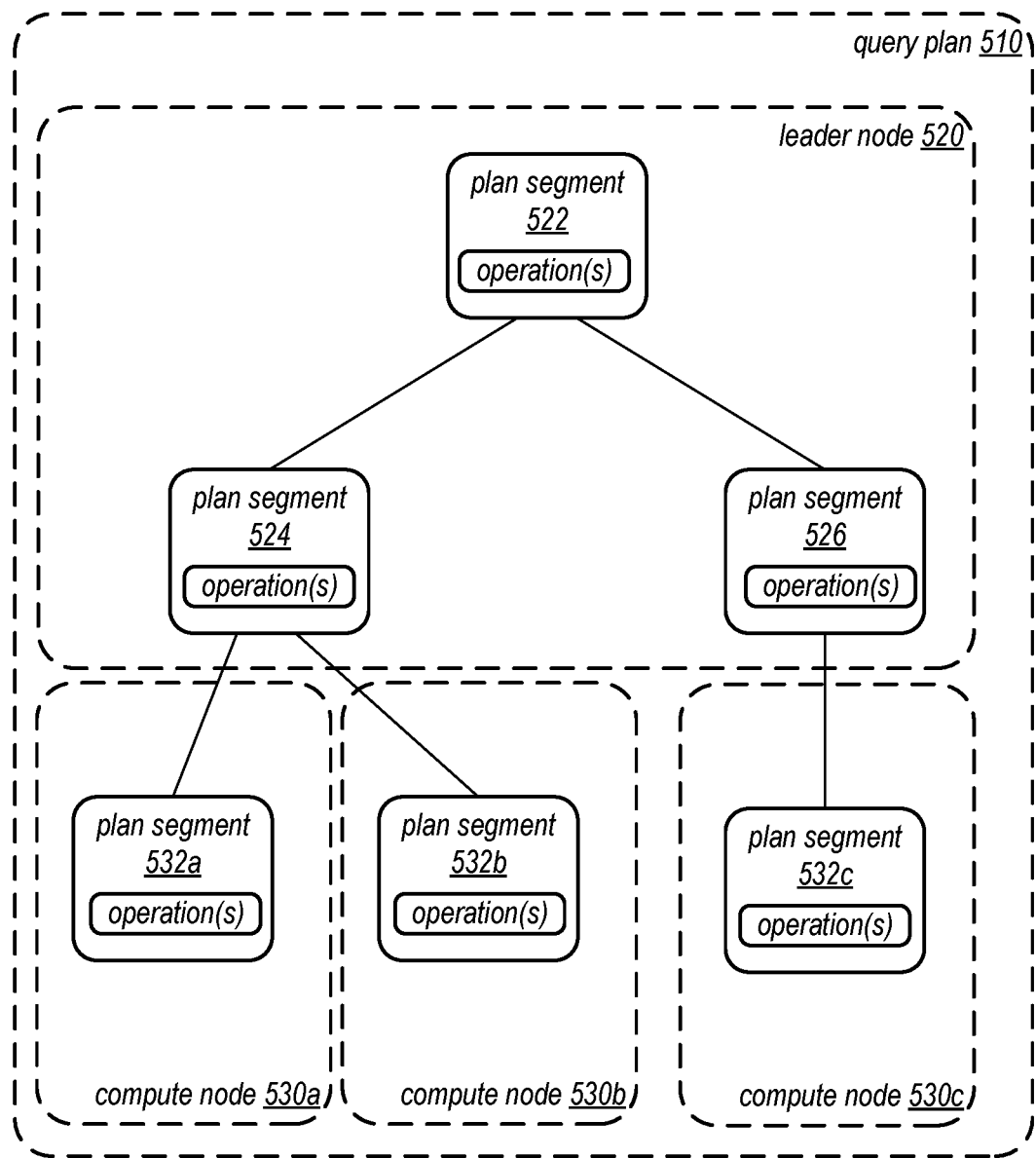
FIG. 5 illustrates an example query plan for execution, according to some embodiments.

FIG. 5 illustrates an example query plan with different segments for execution, according to some embodiments. Query plan 510 may include various operations. These operations may be divided into different components that perform the operations, such as leader node 520 and compute nodes 530a, 530b, and 530c. The operations may be grouped into respective plan segments of one (or more) operations (which may sometimes be referred to as steps), such as plan segments 522, 524, and 526 for leader node 520 and plan segments 532a, 532b, and 532c for compute nodes 530a, 530b, and 530c respectively. As discussed above with regard to FIG. 4 and below with regard to FIGS. 6-9, operations can be added or assigned lower in the plan (e.g., to compute nodes) to reduce the amount of data moved between nodes (e.g., to leader node 520 and/or between compute nodes 530, referred to as data shuffling).

Figure 6:
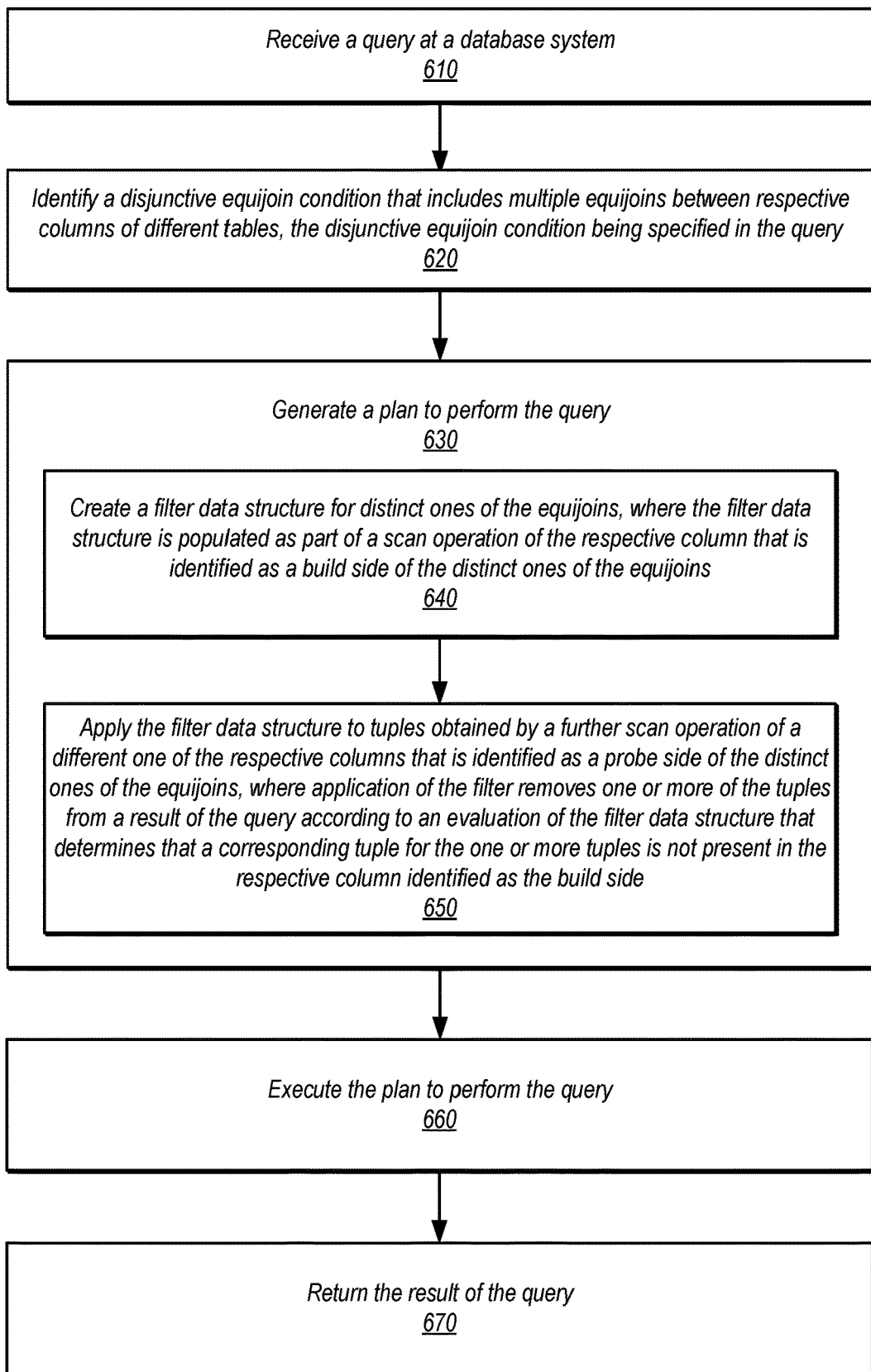
FIG. 6 is a high-level flowchart illustrating methods and techniques to implement run-time filters for disjunctive equijoins, according to some embodiments.

Although FIGS. 2-5 have been described and illustrated in the context of a database service, like a data warehouse service, the various components illustrated and described in FIGS. 2-5 may be easily applied to other database or data storage systems that provide access to database data. As such, FIGS. 2-5 are not intended to be limiting as to other embodiments of a storage engine, query engine, a single or distributed database engine or management system, processing cluster, or other component that may implement using computer resources to optimize performance of disjunctive joins, including resources, hosts, systems, or devices that are separate from the query engine or database management system itself (e.g., an external data replication store or system). FIG. 6 is a high-level flowchart illustrating methods and techniques to implement run-time filters for disjunctive equijoins, according to some embodiments. Various different systems and devices may implement the various methods and techniques described below with regard to FIGS. 6 through 9, either singly or working together. For example, a processing cluster, such as described above with regard to FIGS. 2-5 may implement the various methods. Alternatively, a combination of different systems and devices may implement the described techniques. Therefore, the above examples and or any other systems or devices referenced as performing the illustrated method, are not intended to be limiting as to other different components, modules, systems, or configurations of systems and devices.

In some application areas, such as telephone call data record (a.k.a. CDR) analysis it is common to see disjunctive join conditions like:

(CDR.CALLER_NUM=OF_INTEREST.PHONE_NUM OR  CDR.CALLED_NUM=OF_INTEREST.PHONE_NUM)

When that is the only join condition, using traditional database join technology, that kind of disjunctive join condition cannot be used to perform an efficient join. Instead, the Cartesian product of all rows is computed from the OF_INTEREST table with all rows of the CDR table and then apply the disjunctive join condition as a join post-filter.

In other application areas, in addition to the disjunctive equijoin condition there is one or more normal equijoin conditions. In these case the normal equijoin conditions can be the basis for a more efficient hash join or merge join operation. However, the disjunctive equijoins remain as a join post-filter and will only reduce the number of tuples flowing after the join is evaluated. For example:

T1.X=T2.X AND
(T1.Y=T2.Y1 OR T1.Y=T2.Y2)

For both cases above, these techniques leverage direct or indirect restrictions on the domains of the disjunctive equijoin keys by creating filter(s) to be applied within a disjunction at run-time at the scan node for the larger input side of the join before the join is evaluated.

Accordingly, to improve the performance of a query containing a disjunctive equijoin, the following techniques may be implemented:

creating a key set data structure of some form (e.g., a Bloom filter, Cuckoo filter, key list, or key hash table) for each distinct disjunctive equijoin key expression from the "build" side of the join that is filled while that join's tuple store structure is filled.

at the scan node apply a disjunctive key set restriction condition to each disjunctive equijoin key expression from the "probe" side using the key set data structure from the equated disjunctive equijoin key.

Consider the first example. The key set data structure may be built from OF_INTEREST.PHONE_NUM. For the second example, two separate data structures may be built, from T2.Y1 and T2.Y2.

To illustrate these techniques, a condition operator "PROBABLY_IN" may be used to represent a key set restriction condition where the expression to the left side of the operator is the probe expression, and the expression to the right side of the operator is the expression used to populate the key set data structure. As noted above different types of data structures may be used to implement this condition operator (e.g., a Bloom filter, Cuckoo filter, key list, or key hash table).

Consider again the first example above, the following may be added to the restrictions at the scan node for CDR and both PROBABLY_IN conditions using a single shared key set data structure:

(CDR.CALLER_NUM PROBABLY_IN OF_INTEREST.PHONE_NUM
OR CDR.CALLED_NUM PROBABLY_IN OF_INTEREST.PHONE_NUM)

For the second example, the following restrictions may be added at the scan node for T1:

(T1.Y PROBABLY_IN T2.Y1
OR T1.Y PROBABLY_IN T2.Y2)

Note for the first example that restriction can be evaluated using two separate column scans and then OR them together, or they can be evaluated together as each tuple is projected from the table. In the second example, there is only one column being compared within the key set restriction disjunction, so the entire disjunction can be evaluated within a single column scan.

FIG. 6 describes an example method that may implement the previously discussed techniques for improving performance of disjunctive equijoins. As indicated at 610, a query may be received at a database system, in some embodiments. As discussed above with regard to FIG. 1, queries may be received in various formats (e.g., through statements in a query language, through APIs or other interface-supported instructions, and so on).

As indicated at 620, a disjunctive equijoin condition that includes multiple equijoins between respective columns of different tables, the disjunctive equijoin condition being specified in the query, in some embodiments.

As indicated at 630, a plan to perform the query may be generated. Different query planning techniques may be implemented. For example, various statistics describing the various tables, collections, objects, or other requested data of the query may be evaluated to determine different costs for performing different operations as part of the query. Various rewrite rules to optimally order operations may be applied (e.g., pushing down filter operations). In some embodiments, multiple possible query plans may be generated and a lowest cost plan may then be selected. These planning techniques may include, as part of the plan, creating a filter data structure for distinct ones of the equijoins, where the filter data structure is populated as part of a scan operation of the respective column that is identified as a build side of the distinct ones of the equijoins, as indicated at 640. For example, the filter may be probabilistic (e.g., using a Bloom filter, Cuckoo filter, or range filter) or it could be deterministic (e.g., using an IN list). A Bloom filter may be implemented using an array of bit values, initially set to 0. When an item is added to a set, a hash value is generated for the item that maps to a location in the array. The location bit in the array is set to 1. When checking to see if an item is present in the set, the hash value of the item is generated and the location in the bit array is checked to see if set at 1, if so, then the item is probably present in the set (false positives can occur but not false negatives). Other probabilistic data structures like Cuckoo filters and range filters also can provide false positives, but not false negatives. A Cuckoo filter uses different buckets to represent set membership. When an item is added, two potential buckets are calculated for an item using a hash function, and the hash function XOR'd with a fingerprint of the item. The fingerprint of the item is then placed in one of the buckets, which are later checked for the item.

As indicated at 650, the plan may also include operations to apply the filter data structure to tuples obtained by a further scan operation of a different one of the respective columns that is identified as a probe side of the distinct ones of the equijoins, where application of the filter removes one or more of the tuples from a result of the query according to an evaluation of the filter data structure that determines that a corresponding tuple for the one or more tuples is not present in the respective column identified as the build side, in some embodiments.

As indicated at 660, the plan may be executed to perform the query. As indicated at 670, the result of the query may be returned.

Another technique for improving the performance of disjunctive join conditions uses a specialized join operator that can efficiently evaluate joins with disjunctive join conditions based on hash tables. For example, in one scenario, the technique may be applicable if the join source with the shared column in the disjunctive join condition is the smaller side of the join (e.g., the OF_INTEREST.PHONE_NUM column), then the hash table is built for that smaller side similar to a "normal" equijoin hash join. However, when a tuple is considered from the larger side of the join for this specialized join operator, the hash table is first probed using the first column from that side within the disjunctive join conditions (e.g., CDR.CALLER_NUM), and then probed again using the second column from that side (e.g., CDR.CALLED_NUM).

In another scenario, the technique may be applicable if the join source with two different columns in the disjunctive join condition is the smaller side of the join (e.g., the CDR table), the two hash tables can be built inside the specialized join operator. The first hash table is constructed keyed off of the first column from that side within the disjunctive join conditions (e.g., the CDR.CALLER_NUM column). The second hash table is created keyed off of the second column from that side (e.g., CDR.CALLED_NUM), but in addition it includes a field in the has data record which points back (directly or indirectly) to the hash entry in the first hash table created from the same source tuple. That extra field allows avoids generating incorrect duplicate results.

Figure 7:
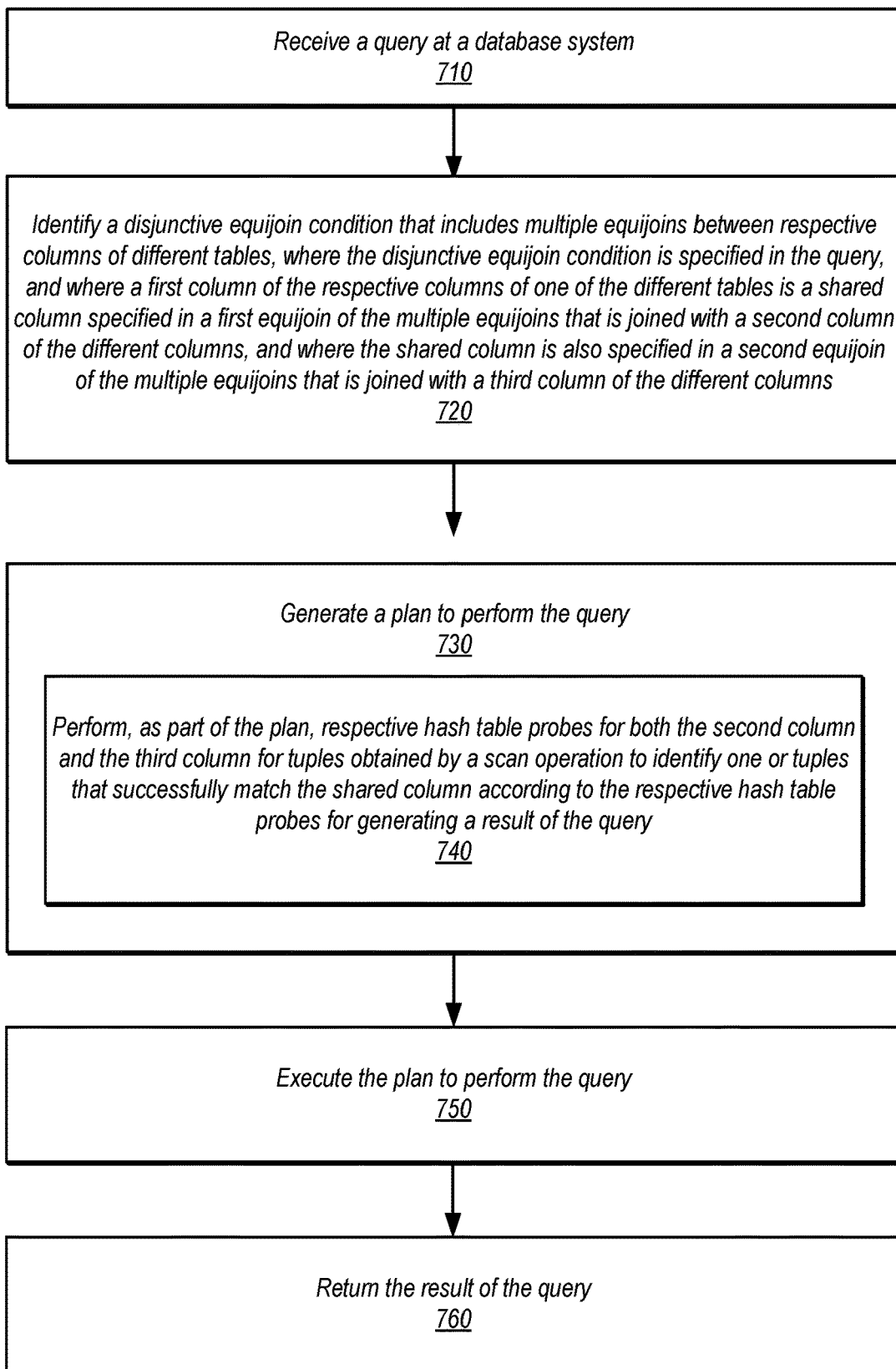
FIG. 7 is a high-level flowchart illustrating methods and techniques to implement disjunctive equijoin hash joins, according to some embodiments.

FIG. 7 is a high-level flowchart illustrating methods and techniques to implement disjunctive equijoin hash joins, according to some embodiments.

As indicated at 710, a query may be received at a database system, in some embodiments. As discussed above with regard to FIG. 1, queries may be received in various formats (e.g., through statements in a query language, through APIs or other interface-supported instructions, and so on).

As indicated at 720, a disjunctive equijoin condition may be identified that includes equijoins between respective columns of different tables, where the disjunctive equijoin condition is specified in the query, and where a first column of the respective columns of one of the different tables is a shared column specified in a first equijoin of the plurality of equijoins that is joined with a second column of the different columns, and where the shared column is also specified in a second equijoin of the plurality of equijoins that is joined with a third column of the different columns, in some embodiments.

As indicated at 730, a plan to perform the query may be generated, in some embodiments. Different query planning techniques may be implemented. For example, various statistics describing the various tables, collections, objects, or other requested data of the query may be evaluated to determine different costs for performing different operations as part of the query. Various rewrite rules to optimally order operations may be applied (e.g., pushing down filter operations). In some embodiments, multiple possible query plans may be generated and a lowest cost plan may then be selected. As part of these planning techniques, operation(s) to perform as part of the plan respective hash table probes for both the second column and the third column for tuples obtained by a scan operation to identify one or tuples that successfully match the shared column according to the respective hash table probes for generating a result of the query, in some embodiments, as indicated at 740.

As indicated at 750, the plan may be executed to perform the query. As indicated at 760, a result of the query may be returned according to an execution of the plan, in some embodiments.

Another technique for optimizing performance of disjunctive involves inferring join conditions. Transitive closure is a technique that is used in database systems to take a set of conditions that includes a equality condition between columns, another condition containing references to only one column where that column is one of the columns being equated, such as:

T1.C1=T2.C1 AND T1.C1<1000

And from that set of conditions we can logically conclude that any set of data which can satisfy both of those two conditions must also satisfy the condition:

T2.C1<1000

And therefore it can be inferred that additional condition and add it to the set of conditions:

T1.C1=T2.C1 AND T1.C1<1000 AND T2.C1<1000

There are obvious performance benefits to adding such conditions in that they may eliminate at the table scan node many rows that cannot possible satisfy the equijoin condition.

Accordingly, techniques to infer disjunctive join conditions may include:

Identifying a single column condition where that column also appears within a disjunctive join condition.

Inferring the appropriate disjunctive condition(s) on other columns within the disjunctive equijoin condition, and adding that inferred condition(s) into the query.

Consider the first example noted above with regard to FIG. 6. Assume a start with that condition and another explicit condition on OF_INTEREST.PHONE_NUM, which limits those phone numbers to be from area code 978:

OF_INTEREST.PHONE_NUM BETWEEN 9780000000 and 9789999999

AND (CDR.CALLER_NUM=OF_INTEREST.PHONE_NUM

OR CDR.CALLED_NUM=OF_INTEREST.PHONE_NUM)

From this set of conditions, it can be concluded that those two conditions can be both satisfied only when the following condition is also satisfied:

(CDR.CALLER_NUM BETWEEN 9780000000 and 9789999999

OR CDR.CALLED_NUM BETWEEN 9780000000 and 9789999999)

Accordingly, that condition can be inferred and added to the set of conditions, now described as:

OF_INTEREST.PHONE_NUM BETWEEN 9780000000 and 9789999999

AND (CDR.CALLER_NUM=OF_INTEREST.PHONE_NUM

OR CDR.CALLED_NUM=OF_INTEREST.PHONE_NUM)

AND (CDR.CALLER_NUM BETWEEN 9780000000 and 9789999999

OR CDR.CALLED_NUM BETWEEN 9780000000 and 9789999999)

So, in the above case, a disjunctive condition was inferred on the CDR fat table that effectively restricts it to less than two US area codes out of 335, providing a big improvement in performance.

In some embodiments, inference of disjunctive join conditions can be inferred using statistical information collected and maintained for data in a table that is a condition, like the range of US area codes above. For example, zone maps may be data value ranges maintained for groups of data in a range of data blocks that indicates the range of data values stored in those data blocks. Those ranges could be used to determine new conditions to add similar to the range restrictions discussed above.

Figure 8:
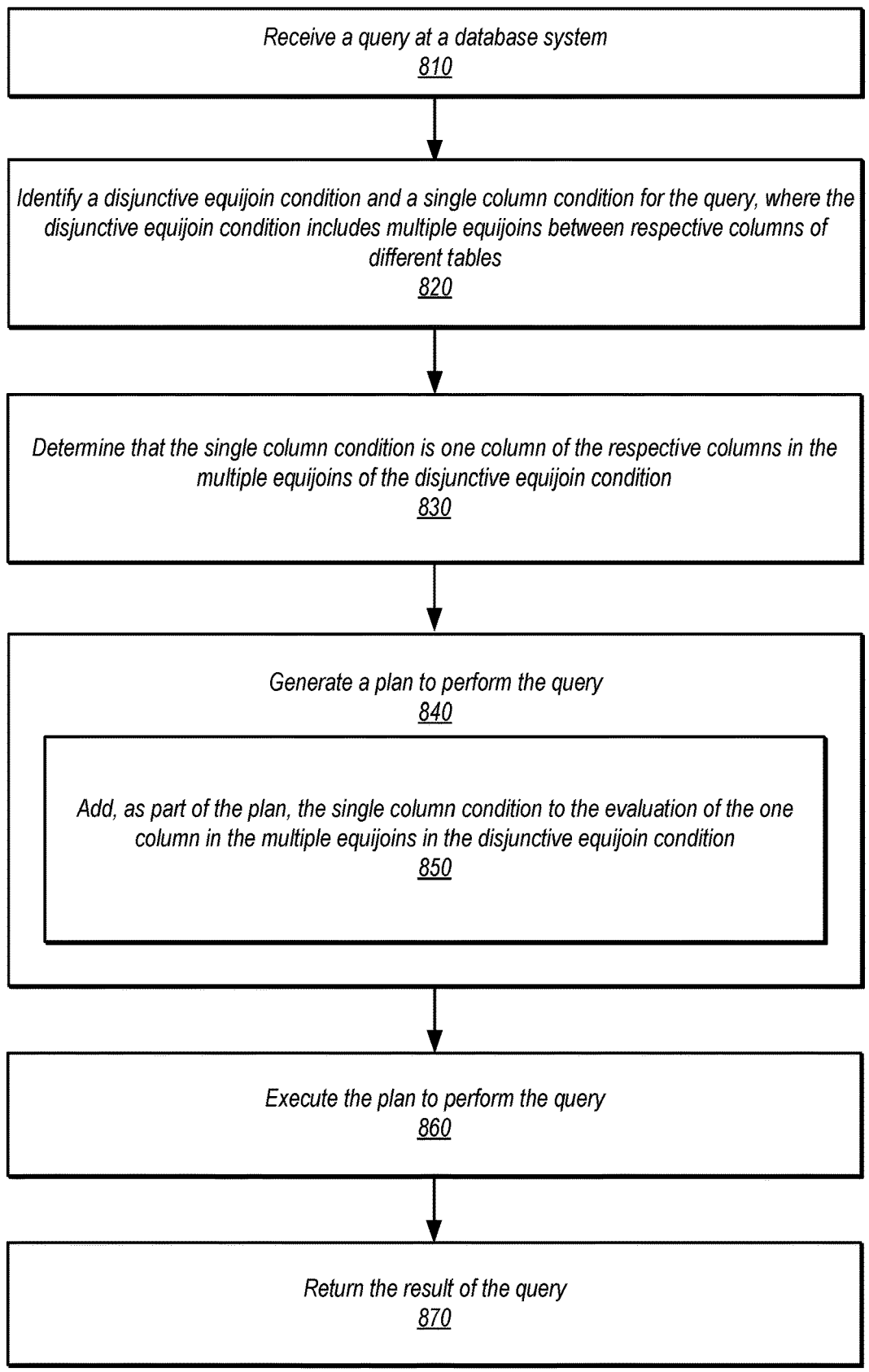
FIG. 8 is a high-level flowchart illustrating methods and techniques to implement evaluating segments of a query plan for execution, according to some embodiments.

FIG. 8 is a high-level flowchart illustrating methods and techniques to implement evaluating segments of a query plan for execution, according to some embodiments.

As indicated at 810, a query may be received at a database system, in some embodiments. As discussed above with regard to FIG. 1, queries may be received in various formats (e.g., through statements in a query language, through APIs or other interface-supported instructions, and so on).

As indicated at 820, a disjunctive equijoin condition and a single column condition for the query may be identified, where the disjunctive equijoin condition comprises a plurality of equijoins between respective columns of different tables, in some embodiments As indicated at 830, a determination may be made that that the single column condition is one column of the respective columns in the plurality of equijoins of the disjunctive equijoin condition, in some embodiments.

As indicated at 840, a plan to perform the query may be generated, in some embodiments. Different query planning techniques may be implemented. For example, various statistics describing the various tables, collections, objects, or other requested data of the query may be evaluated to determine different costs for performing different operations as part of the query. Various rewrite rules to optimally order operations may be applied (e.g., pushing down filter operations). In some embodiments, multiple possible query plans may be generated and a lowest cost plan may then be selected. As part of these planning techniques, add, as part of the plan, the single column condition to the evaluation of the one column in the plurality of equijoins in the disjunctive equijoin condition, in some embodiments, as indicated at 850.

As indicated at 860, the plan may be executed to perform the query. As indicated at 870, a result of the query may be returned according to an execution of the plan, in some embodiments.

In some cases, it is not be possible to infer any local disjunctive conditions. For those cases a new form of inference may be used which can sometimes be applied to infer additional disjunctive join conditions that refer to fewer tables than the original disjunctive join conditions, and that therefore can be applied lower in the join tree thereby reducing the costs of the higher level joins resulting in accelerated query performance.

The following techniques may follow the logical rules described above with regard to FIG. 1, but the criteria for selection of which, if any, of the possible derived conditions to actually infer is changed specifically to minimize the costs of those higher level joins. It may be understood that the number of tables referenced within the original disjunctive join condition may be referred to as the degree of that condition. Therefore the derived disjunctions that are described as having a lower degree than the original condition may be so because they refer to fewer tables.

The following techniques may apply the principle, "where possible and sensible, for each disjunctive join condition which refers to N tables, infer one or more additional disjunctive join conditions that refer to N−1 or fewer tables. Conditions for applying such techniques may include:

The disjunctive join condition contains reference to N tables, where N is at least three Each disjunct within the disjunctive join condition is either a single simple condition, or a nested conjunction of conditions At least one of the disjuncts is a nested conjunction of conditions For each disjunct, identify at least one condition within it that refers to less than N tables a set of disjuncts can be found that collectively refer to less than N tables The following condition is an example of the simplest such disjunctive join condition for which this method is valid:

((n1.n_name='GERMANY')
or (n2.n_name='GERMANY' and lineitem.l_quantity>45))

This disjunctive join condition refers to three tables, N1, N2, and LINEITEM. The first disjunct is a simple condition on N1. The second disjunct is a nested conjunction containing a conjunct referring to N2 and a conjunct referring to LINEITEM. From this disjunctive join condition, local (i.e. single table) disjunctive conditions cannot be inferred. However, potentially two table disjunctive join conditions can be inferred:

((n1.n_name='GERMANY') or (n2.n_name='GERMANY'))

Or a different two table disjunctive join condition can be inferred:

((n1.n_name='GERMANY') or (lineitem.l_quantity>45))

Or both could be inferred;
and ((n1.n_name='GERMANY') or (n2.n_name='GERMANY'))
and ((n1.n_name='GERMANY') or (lineitem.l_quantity>45))

The decision process for these techniques can be applied at a point in time where there is a join subtree topology to consider, where in theory that subtree topology could either be proposed (e.g., during the join tree enumeration, which allows for the optimizations to be considered as part of a costing process) or actually determined (e.g., after join enumeration has been completed).

The requirement for the decision process is that we have a join operator on at least 3 tables and less than N tables where it is known that the set of tables flowing from the left side of the join and the set of tables flowing from the right side of the join. The the set of conditions derivable from the original disjunctive join condition may be analyzed to find those which are local to one side of that join operator and where there are least 2 tables on that side of the join. If such a condition can be identified or conditions, then they can be inferred.

Care may be taken when applying this decision process to consider that the inferred conditions may not be statistically independent from the original condition. In fact they may be highly correlated with that original condition. This implies, for instance, that finding an inferrable 2 table inferrable condition will make it much less likely that a 3 table condition including those 2 tables will provide sufficient additional filtering value to make it worth inferring. As in any query optimization involving filters, the lower in the query operator tree where a filter can be applied, the more benefit to the performance of that query.

Figure 9:
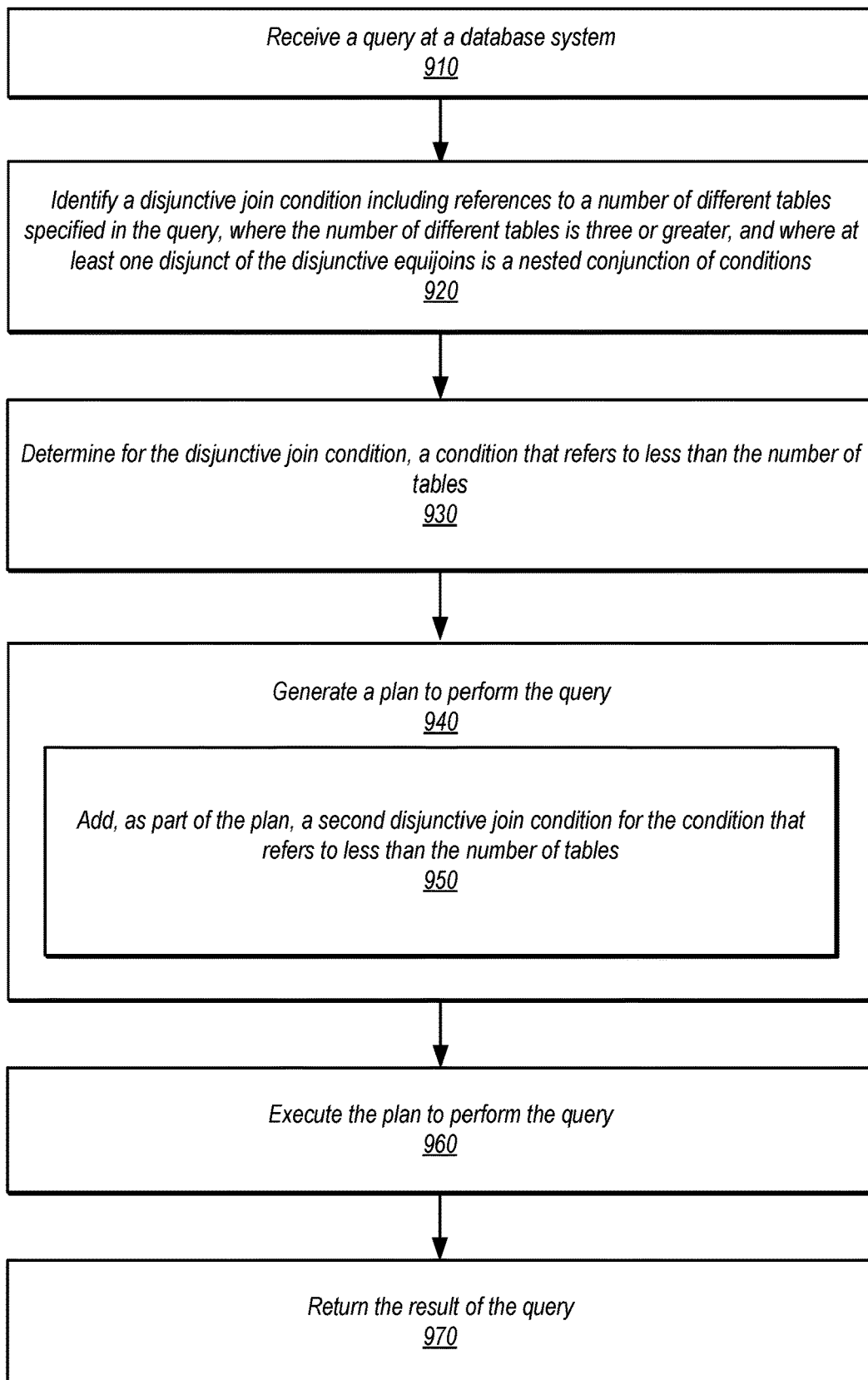
FIG. 9 is a high-level flowchart illustrating methods and techniques to infer lower degree disjunctive join conditions, according to some embodiments.

FIG. 9 is a high-level flowchart illustrating methods and techniques to infer lower degree disjunctive join conditions, according to some embodiments.

As indicated at 910, a query may be received at a database system, in some embodiments. As discussed above with regard to FIG. 1, queries may be received in various formats (e.g., through statements in a query language, through APIs or other interface-supported instructions, and so on).

As indicated at 920, a disjunctive join condition may be identified that includes references to a number of different tables specified in the query, where the number of different tables is three or greater, and where at least one disjunct of the disjunctive join condition is a nested conjunction of conditions, in some embodiments.

As indicated at 930, a determination may be made for the disjunctive join condition, of a condition that refers to less than the number of tables, in some embodiments.

As indicated at 940, a plan to perform the query may be generated, in some embodiments. Different query planning techniques may be implemented. For example, various statistics describing the various tables, collections, objects, or other requested data of the query may be evaluated to determine different costs for performing different operations as part of the query. Various rewrite rules to optimally order operations may be applied (e.g., pushing down filter operations). In some embodiments, multiple possible query plans may be generated and a lowest cost plan may then be selected. As part of these planning techniques, add, as part of the plan, the single column condition to the evaluation of the one column in the plurality of equijoins in the disjunctive equijoin condition, in some embodiments, as indicated at 950.

As indicated at 960, the plan may be executed to perform the query. As indicated at 970, a result of the query may be returned according to an execution of the plan, in some embodiments.

The various query plans generated as discussed above with regard to FIGS. 6-9 can be provided responsive to a request, such as an EXPLAIN request or parameter included when submitting or as part of the query statement. The added plan features or modified plan features may be included in the display of the provided plan.

The methods described herein may in various embodiments be implemented by any combination of hardware and software. For example, in one embodiment, the methods may be implemented by a computer system (e.g., a computer system as in FIG. 10) that includes one or more processors executing program instructions stored on a computer-readable storage medium coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Embodiments of disjunctive join optimizations implemented as part of query planning as described herein may be executed on one or more computer systems, which may interact with various other devices. One such computer system is illustrated by FIG. 10. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

Figure 10:
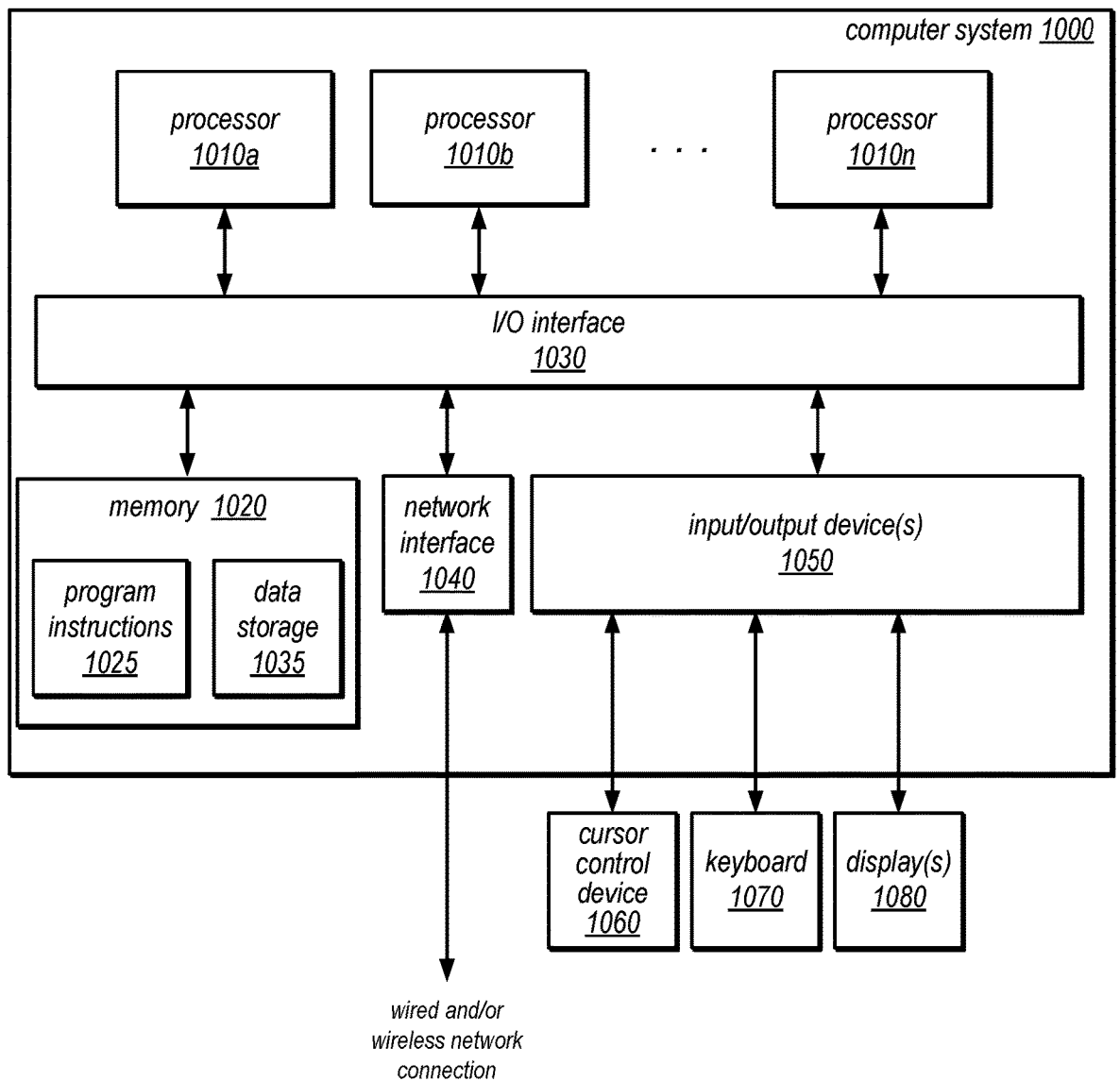
FIG. 10 illustrates an example system to implement the various methods, techniques, and systems described herein, according to some embodiments.

As shown in FIG. 10, memory 1020 may include program instructions 1025, may implement the various methods and techniques as described herein, and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. For example, leader nodes within a data warehouse system may present data storage services and/or database services to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

The invention claimed is:

1. A system, comprising:
a plurality of nodes implementing a processing cluster, respectively comprising at least one processor and a memory;
wherein the processing cluster is configured to:
receive a query;
parse the query to identify a disjunctive join condition comprising references to a number of different tables specified in the query, wherein the number of different tables is three or greater, and wherein at least one of disjunct of the disjunctive join condition is a nested conjunction of conditions;
determine for the disjunctive join condition, a condition that refers to less than the number of tables;
generate a plan to perform the query, wherein the query plan comprises one or more operations to:
add a second disjunctive join condition that refers to less than the number of tables;
execute the plan to perform the query; and
return a result of the query.

2. The system of claim 1, wherein a different disjunct of the disjunctive join condition is a single condition.

3. The system of claim 1, wherein the second disjunctive join condition refers to more than one table.

4. The system of claim 1, wherein the query plan further comprises adding a third disjunctive join condition that refers to less than the number of tables.

5. A method, comprising:
receiving a query at a database system;
identifying, by the database system, a disjunctive join condition comprising references to a number of different tables specified in the query, wherein the number of different tables is three or greater, and wherein at least one of disjunct of the disjunctive join condition is a nested conjunction of conditions;
determining, by the database system, for the disjunctive join condition, a condition that refers to less than the number of tables;
generating, by the database system, a plan to perform the query, wherein the query plan comprises:
adding a second disjunctive join condition that refers to less than the number of tables;
executing, by the database system, the plan to perform the query; and
returning, by the database system, a result of the query.

6. The method of claim 5, wherein a different disjunct of the disjunctive join condition is a single condition.

7. The method of claim 5, wherein the second disjunctive join condition refers to more than one table.

8. The method of claim 5, wherein the query plan further comprises adding a third disjunctive join condition that refers to less than the number of tables.

9. The method of claim 5, wherein the determination to add the second join condition is performed after join enumeration.

10. The method of claim 5, wherein the determination to add the second join condition is performed during join enumeration.

11. The method of claim 5, further comprising returning the query plan including the second disjunctive join condition responsive to a request to provide the query plan.

12. The method of claim 5, wherein the database system is hosted as part of a database service implemented as part of a provider network.

13. One or more non-transitory, computer-readable storage media, storing program instructions that when executed on or across one or more computing devices cause the one or more computing devices to implement:
receiving a query at a database system;
identifying, by the database system, a disjunctive join condition comprising references to a number of different tables specified in the query, wherein the number of different tables is three or greater, and wherein at least one of disjunct of the disjunctive join condition is a nested conjunction of conditions;
determining, by the database system, for the disjunctive join condition, a condition that refers to less than the number of tables;
generating, by the database system, a plan to perform the query, wherein the query plan comprises:
adding a second disjunctive join condition that refers to less than the number of tables;
executing, by the database system, the plan to perform the query; and
returning, by the database system, a result of the query.

14. The one or more non-transitory, computer-readable storage media of claim 13, wherein a different disjunct of the disjunctive join condition is a single condition.

15. The one or more non-transitory, computer-readable storage media of claim 14, wherein the second disjunctive join condition refers to more than one table.

16. The one or more non-transitory, computer-readable storage media of claim 14, wherein the query plan further comprises adding a third disjunctive join condition that refers to less than the number of tables.

17. The one or more non-transitory, computer-readable storage media of claim 14, wherein the determination to add the second join condition is performed after join enumeration.

18. The one or more non-transitory, computer-readable storage media of claim 14, wherein the determination to add the second join condition is performed during join enumeration.

19. The one or more non-transitory, computer-readable storage media of claim 13, storing further program instructions that when executed on or across the other one or more computing devices, causes the one or more computing devices to implement returning the query plan including the second disjunctive join condition responsive to a request to provide the query plan.

20. The one or more non-transitory, computer-readable storage media of claim 13, wherein the database system is hosted as part of a database service implemented as part of a provider network.

* * * * *